US006211987B1

(12) United States Patent
Park

(10) Patent No.: US 6,211,987 B1
(45) Date of Patent: *Apr. 3, 2001

(54) OPTICAL SCANNING TECHNIQUE

(75) Inventor: Sang-Shin Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/342,183

(22) Filed: Jun. 29, 1999

(30) Foreign Application Priority Data

Jun. 29, 1998 (KR) .................................. 98-24983

(51) Int. Cl.⁷ .................................................. G02B 26/08
(52) U.S. Cl. .......................... 359/196; 359/197; 359/216; 347/248; 250/236
(58) Field of Search ..................... 359/196, 197, 359/216; 250/230, 234, 236; 347/248, 249, 250

(56) References Cited

U.S. PATENT DOCUMENTS

| 5,126,756 | * | 6/1992 | Ban | 347/232 |
| 5,772,339 | * | 6/1998 | Yamaguchi | 400/55 |
| 6,043,484 | * | 3/2000 | Park | 250/234 |

* cited by examiner

Primary Examiner—Darren Schuberg
(74) Attorney, Agent, or Firm—Robert E. Bushnell, Esq.

(57) ABSTRACT

An optical scanning system for a printer, for example, includes: an optical scanning unit for scanning light onto an image print region of a photosensitive belt; a photodetector disposed at an edge of the photosensitive belt for receiving the light emitted from the optical scanning unit, and for outputting a pulse signal in response to the received light; a belt position calculator for counting a hold time of the pulse signal output from the photodetector in order to calculate an edge point of the photosensitive belt; a memory for storing information about the delay time from an end point of the pulse signal to a point in time at which the optical scanning unit starts scanning light onto a start point of the image print region of the photosensitive belt; a delay time setting unit for accessing the memory in order to locate delay time information, corresponding to the edge point of the photosensitive belt, output from the belt position calculator; a scanning start signal generator for counting a time duration corresponding to the delay time information output from the delay time setting unit, and for outputting a scanning start signal in accordance therewith; and a scanning controller for controlling the optical scanning unit such that the optical scanning unit emits light corresponding to an image signal in synchronism with the scanning start signal.

14 Claims, 3 Drawing Sheets

OPTICAL SCANNING TECHNIQUE

CLAIM OF PRIORITY

This application makes reference to, incorporates the same herein, and claims all benefits accruing under 35 U.S.C. §119 from my application OPTICAL SCANNING SYSTEM FOR PRINTER filed with the Korean Industrial Property Office on Jun. 29, 1998 and there duly assigned Serial No. 24983/1998.

BACKGROUND OF THE INVENTION

1. Field of the Invention

The present invention relates to an optical scanning system, and more particularly, to an optical scanning technique for a printer, for example, in which an optical scanning unit accurately scans light onto an image print region of a photosensitive belt regardless of track deflection of the photosensitive belt.

2. Description of the Related Art

An earlier optical scanning system comprises an optical scanning unit, a photodetector and an optical scanning controller.

The optical scanning unit having a light source, a rotary optical polygon and a lens unit scans light in a direction perpendicular to the traveling direction of a photosensitive belt, i.e., in a main-scanning direction, along a scanning line on the photosensitive belt traveling around three rollers, and the photodetector is installed at the edge of the photosensitive belt and detects light scanning which has deviated from the photosensitive belt. The optical scanning controller controls the driving of the optical scanning unit according to a pulse signal output from the photodetector in response to the light received by the photodetector.

The light emitted from the light source is reflected by the rotary optical polygon rotating at a predetermined speed. The pulse signal is output to the optical scanning controller in response to the light received by the photodetector. The optical scanning controller determines the end point of the pulse signal as the point in time at which the light emitted from the optical scanning unit reaches the edge of the photosensitive belt, and stops the driving of the light source for a predetermined time duration from the end point of the pulse signal such that the light emitted from the light scanning unit scans from the start point of an image print region on the photosensitive belt. That is, the light does not scan a non-print region of the photosensitive belt. Then, after the predetermined time delay, the light source is driven such that the light scans onto the image print region of the photosensitive belt according to an image signal.

In such operation of the optical scanning system, the duration of the time delay is set based on a normal traveling state where the photosensitive belt travels along a predetermined track.

The scanning speed of a spot of light emitted from the light scanning unit, from a reference point along the scanning line via an edge point on the edge of the photosensitive belt, is different, and such a difference is due to the distances between the light source and each point on the scanning line being different.

In the case where the edge point on the edge of the photosensitive belt is shifted due to an irregular traveling path of the photosensitive belt, that is, where the distance between the reference point and the edge point changes, the light emitted from the light source cannot scan accurately from the start point of the image print region of the photosensitive belt. Because the duration of the time delay is set based on the normal traveling of the photosensitive belt, the start point of the light scanning is deflected, thereby deteriorating the print quality.

SUMMARY OF THE INVENTION

To solve the above problems, it is an object of the present invention to provide an optical scanning technique for a printer, for example, in which light accurately scans the start point of an image print region of a photosensitive belt, even when the photosensitive belt deviates slightly from a normal traveling path.

To achieve the object of the present invention, there is provided an optical scanning system comprising: an optical scanning unit for scanning light onto an image print region of a photosensitive belt; a photodetector disposed at an edge of the photosensitive belt, for receiving light emitted from the optical scanning unit, and for outputting a pulse signal in response to the received light; a belt position calculator for counting a hold time of the pulse signal output from the photodetector in order to calculate an edge point of the photosensitive belt; a memory for storing information about a delay time from an end point of the pulse signal to a point in time at which the optical scanning unit starts scanning light onto the start point of the image print region of the photosensitive belt; a delay time setting unit for accessing the memory in order to locate delay time information, corresponding to the edge point of the photosensitive belt, output from the belt position calculator; a scanning start signal generator for counting a time duration corresponding to the delay time information output from the delay time setting unit, and for outputting a scanning start signal in accordance therewith; and a scanning controller for controlling the optical scanning unit such that the optical scanning unit emits light corresponding to an image signal in synchronism with the scanning start signal.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
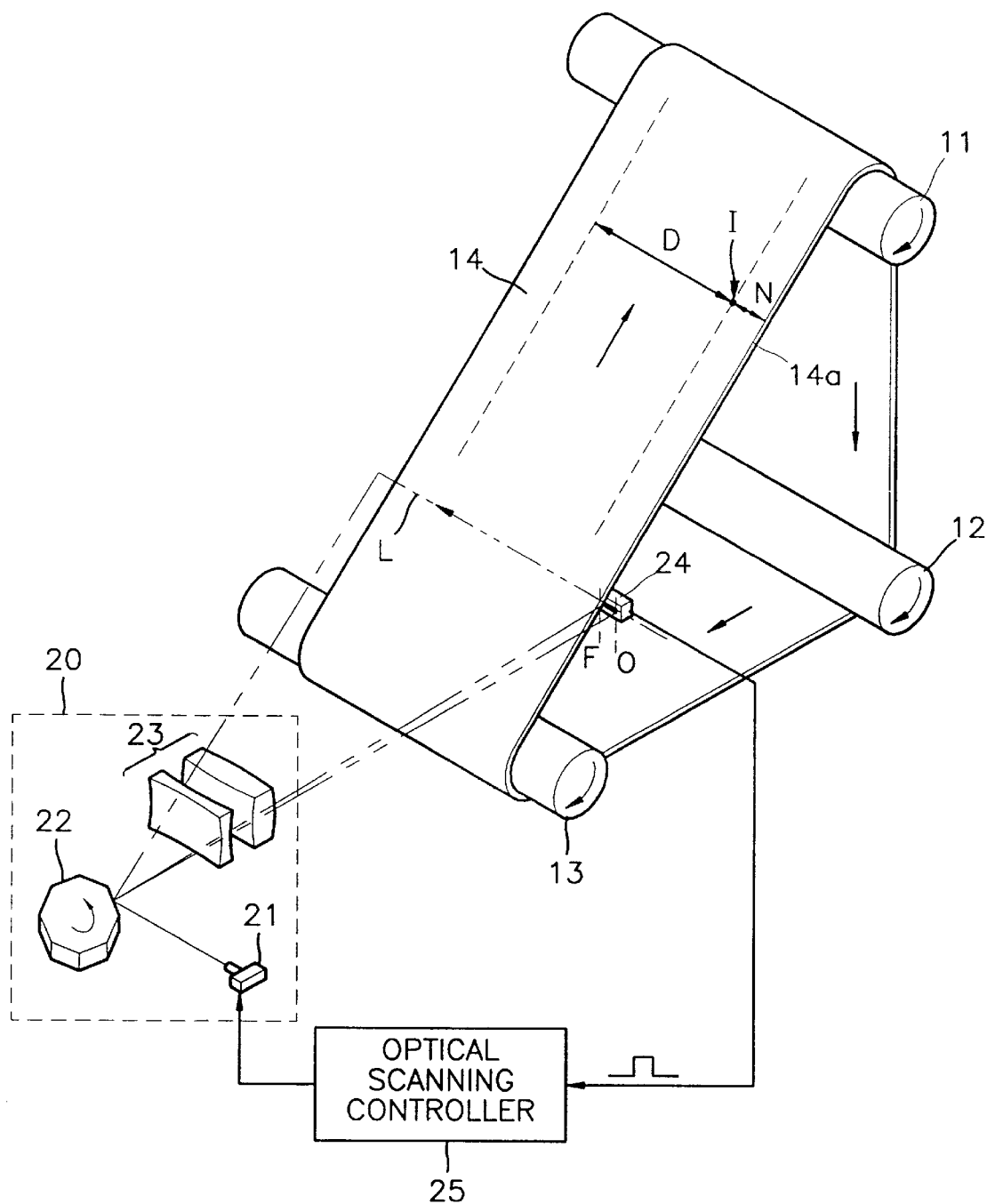
FIG. 1 is a perspective view of an optical scanning system adopted in a printer.

FIG. 1 shows an optical scanning system as discussed in detail in the Description of the Related Art above.

The optical scanning system includes an optical scanning unit 20, a photodetector 24, and an optical scanning controller 25.

The optical scanning unit 20 has a light source 21, a rotary optical polygon 22 and a lens unit 23 for scanning light in the direction perpendicular to the traveling direction of the photosensitive belt 14, that is, in a main-scanning direction along a scanning line L on the photosensitive belt 14 traveling around three rollers 11, 12 and 13.

The photodetector 24 is installed at the edge 14a of the photosensitive belt 14 and detects light scanning which has deviated from the photosensitive belt 14.

The optical scanning controller 25 controls the driving of the optical scanning unit 20 according to a pulse signal output from the photodetector 24.

The light emitted from the light source 21 is reflected by the rotary optical polygon 22, and the pulse signal is output in response to the light received by the photodetector 24 and transmitted to the optical scanning controller 25. The optical scanning controller 25 determines the end point of the pulse signal as the point in time at which the light emitted from the optical scanning unit 20 reaches the edge of the photosensitive belt 14, and stops the driving of the light source 21 for a predetermined time duration from the end point of the pulse signal such that the light emitted from the light scanning unit 20 scans from the start point I of an image print region D on the photosensitive belt 14. That is, the light does not scan a non-print region N of the photosensitive belt 14. Then, after the predetermined time duration delay, the light source 21 is driven such that the light scans onto the image print region D of the photosensitive belt 14 according to an image signal.

Figure 2:
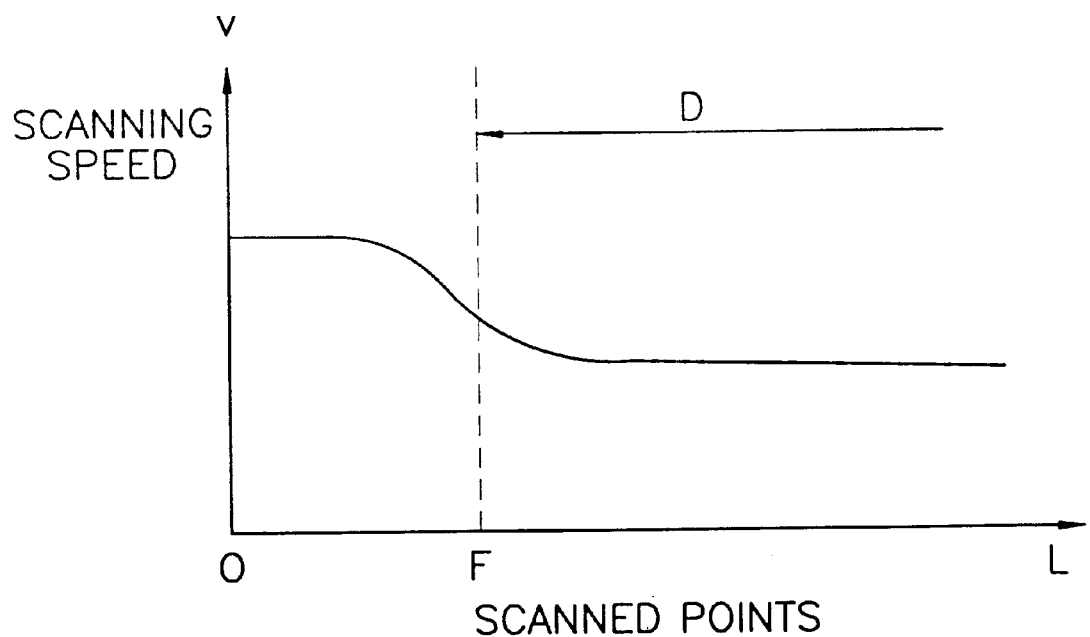
FIG. 2 is a graph showing the relationship between the scanning speed of a spot of light and scanned points in the optical scanning system of FIG. 1.

FIG. 2 is a graph showing the scanning speed of a spot of light emitted from the light scanning unit 20, from a reference point O along the scanning line L via an edge point F on the edge 14a of the photosensitive belt 14. As shown in the graph of FIG. 2, the scanning speed of the light is different, and such a difference is due to the distances between the light source 21 and each point on the scanning line L being different.

Figure 3:
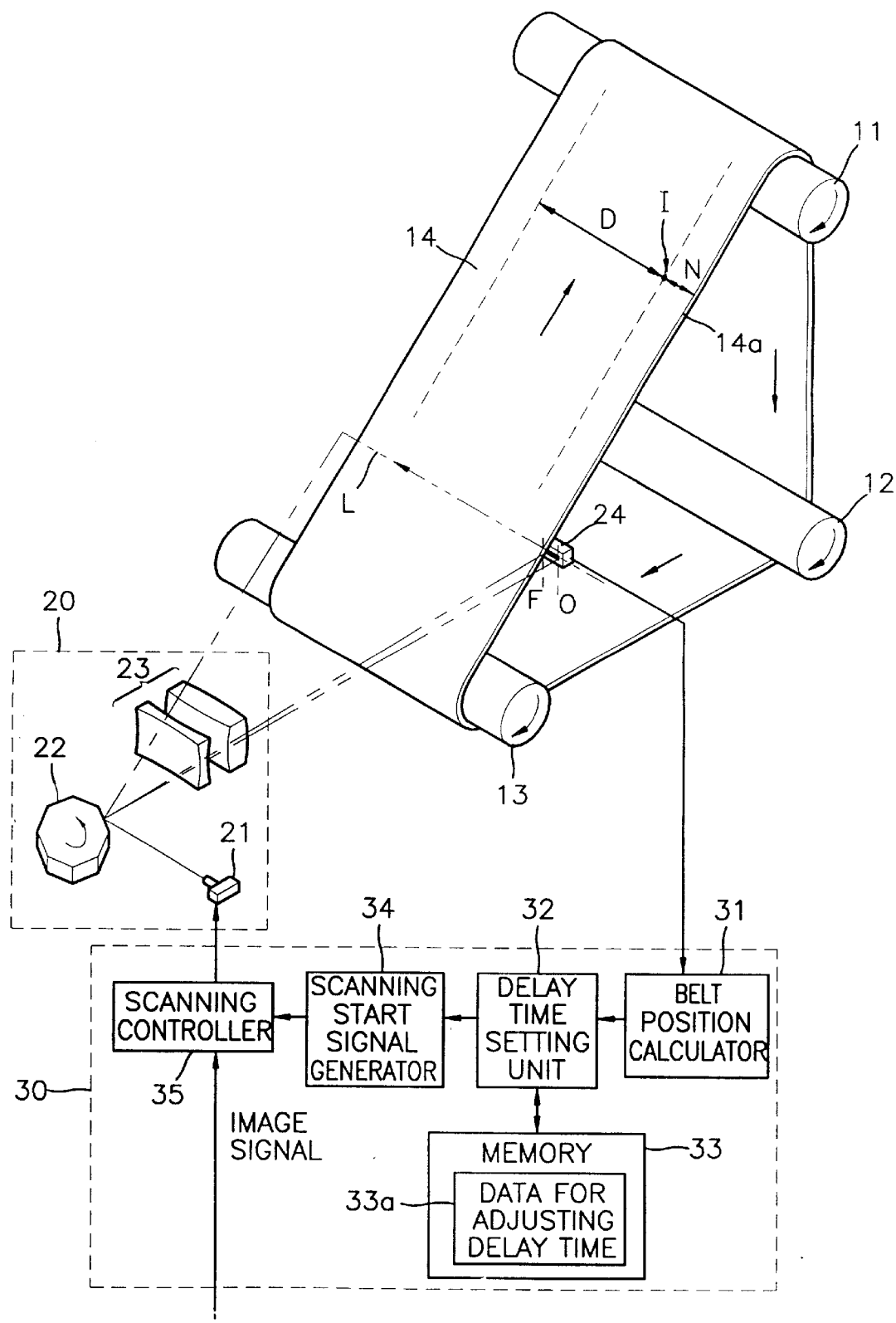
FIG. 3 shows the structure of an optical scanning system for a printer according to the present invention.

In FIG. 3, the same reference numerals as those of FIG. 1 represent the same elements.

Referring to FIG. 3, an optical scanning system for a printer according to a preferred embodiment of the present invention comprises an optical scanning unit 20, a photodetector 24 and an optical scanning controlling portion 30.

The optical scanning unit 20 includes a light source 21 for emitting light, a rotary optical polygon 22 for reflecting and deflecting the light incident from the light source 21, and a lens unit 23 for condensing the light reflected by the rotary optical polygon 22. The photodetector 24 is installed at the inner side and toward the edge 14a of the photosensitive belt 14. The optical scanning controlling portion 30 includes a belt position calculator 31, a delay time setting unit 32, a memory 33, a scanning start signal generator 34, and a scanning controller 35.

The belt position calculator 31 counts the width of a pulse signal output from the photodetector 24, to calculate the edge point F on the edge 14a of the photosensitive belt 14 in a main-scanning direction. In detail, the time corresponding to the width of the pulse signal output from the photodetector 24 when the photosensitive belt 14 is in a normal traveling path is set as a reference time, and the counted width of the pulse signal and the reference time are compared. From the difference between the hold time and the reference time, the degree of deflection of the edge 14a of the photosensitive belt 14 from its normal traveling path can be measured. Information about the edge point F on the edge 14a of the photosensitive belt 14 is transmitted to the delay time setting unit 32.

The memory 33 stores data for adjusting delay time 33a, which is used to determine the delay time applied according to the information on the edge point F of the edge 14a of the photosensitive belt 14, which is provided from the belt position calculator 31. Here, the delay time refers to the time from a receiving end point of the pulse signal output from the photodetector 24 and the point in time at which the light scans the start point I of the image print region D of the photosensitive belt 14, which depends on the edge point F of the edge 14a of the photosensitive belt 14.

The delay time setting unit 32 accesses the memory 33 to set a delay time applied according to the information on the edge point F of the photosensitive belt 14, which is provided from the belt position calculator 31, based on the data for adjusting delay time 33a, and outputs the set delay time to the scanning start signal generator 34.

The scanning start signal generator 34 starts counting time from the end point of the pulse signal output from the photodetector 24, and outputs a scanning start signal to the scanning controller 35 when the counted time reaches the delay time set by the delay time setting unit 32.

The scanning controller 35 controls the on/off of the light source 21 such that the light corresponding to a scan line of an image signal is emitted in synchronism with the transmitted scanning start signal.

After such control, the scanning controller 35 turns on the light source 21 for a predetermined duration of time such that the photodetector 24 outputs a pulse signal as soon as it receives the light. Then, the scanning controller 35 turns off the light source 21 until another scanning start signal is input.

After the scanning start signal is input, the scanning controller 35 controls on/off of the light source 21 in response to the following scan line of the image signal.

As described above, in the optical scanning system for a printer according to the present invention, the light can accurately scan the start point of an image print region of a photosensitive belt even when the edge point of the photosensitive belt is deflected from its normal traveling path, thereby preventing deterioration of print quality.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical scanning system, comprising:
    an optical scanning unit for scanning light onto an image print region of a photosensitive belt;
    a photodetector disposed at an edge of the photosensitive belt for receiving light emitted from the optical scanning unit, and for outputting a pulse signal in response to the received light;
    a belt position calculator for counting a hold time of the pulse signal output from the photodetector in order to calculate an edge point of the photosensitive belt;
    a memory for storing information about a delay time from an end point of the pulse signal to a point in time at which the optical scanning unit starts scanning light onto a start point of the image print region of the photosensitive belt;
    a delay time setting unit for accessing the memory in order to locate delay time information, corresponding to the edge point of the photosensitive belt, output from the belt position calculator;
    a scanning start signal generator for counting a time duration corresponding to the delay time information output from the delay time setting unit, and for outputting a scanning start signal in accordance therewith; and
    a scanning controller for controlling the optical scanning unit such that the optical scanning unit emits light corresponding to an image signal in synchronism with the scanning start signal.

2. The optical scanning system of claim 1, the optical scanning unit comprising:
    a light source; and
    a rotary optical polygon rotatably installed for reflecting and deflecting light incident from the light source.

3. A method of scanning in an optical scanning system, the method comprising the steps of:
- scanning light onto an image print region of a photosensitive belt with an optical scanning unit;
- receiving light emitted from the optical scanning unit at an edge of the photosensitive belt, and outputting a pulse signal in response to the received light;
- counting a hold time of the pulse signal output from the photodetector in order to calculate an edge point of the photosensitive belt with a belt position calculator;
- accessing a memory storing data to be applied to a delay time from an end point of the pulse signal to a point in time at which the optical scanning unit starts scanning light onto a start point of the print region of the photosensitive belt corresponding to the edge point of the photosensitive belt output from the belt position calculator, and outputting the delay time;
- counting a time duration corresponding to the delay time information, and outputting a scanning start signal in accordance therewith; and
- controlling the optical scanning unit such that the optical scanning unit emits light corresponding to an image signal in synchronism with the scanning start signal.

4. The method of claim 3, the light scanning step comprising:
- emitting light from a light source; and
- reflecting and deflecting light incident from the light source with a rotary optical polygon.

5. An optical scanning system, comprising:
- an optical scanning unit for scanning light onto an image print region of a photosensitive belt;
- a photodetector disposed at an edge of the photosensitive belt for receiving light emitted from the optical scanning unit, and for outputting a pulse signal in response to the received light; and
- an optical scanning controlling portion for controlling the optical scanning unit such that the optical scanning unit emits light corresponding to an image signal in synchronism with a scanning start signal, the scanning start signal being controlled in accordance with the pulse signal output from the photodetector;
- said optical scanning controlling portion comprising a belt position calculator for counting a hold time of the pulse signal output from the photodetector in order to calculate an edge point of the photosensitive belt.

6. The optical scanning system of claim 5, said optical scanning controlling portion further comprising:
- a memory for storing information about a delay time from an end point of the pulse signal to a point in time at which the optical scanning unit starts scanning light onto a start point of the image print region of the photosensitive belt.

7. The optical scanning system of claim 6, said optical scanning controlling portion further comprising:
- a delay time setting unit for accessing the memory in order to locate delay time information, corresponding to the edge point of the photosensitive belt, output from the belt position calculator.

8. The optical scanning system of claim 7, said optical scanning controlling portion further comprising:
- a scanning start signal generator for counting a time duration corresponding to the delay time information output from the delay time setting unit, and for outputting the scanning start signal in accordance therewith.

9. An optical scanning system, comprising:
- an optical scanning unit for scanning light onto an image print region of a photosensitive belt;
- a photodetector disposed at an edge of the photosensitive belt for receiving light emitted from the optical scanning unit, and for outputting a pulse signal in response to the received light; and
- an optical scanning controlling portion for controlling the optical scanning unit such that the optical scanning unit emits light corresponding to an image signal in synchronism with a scanning start signal, the scanning start signal being controlled in accordance with the pulse signal output from the photodetector;
- said optical scanning portion further comprising a memory for storing information about a delay time from an end point of the pulse signal to a point in time at which the optical scanning unit starts scanning light onto a start point of the image print region of the photosensitive belt.

10. The optical scanning system of claim 9, said optical scanning controlling portion further comprising:
- a delay time setting unit for accessing the memory in order to locate delay time information, corresponding to the edge point of the photosensitive belt, output from the belt position calculator.

11. The optical scanning system of claim 10, said optical scanning controlling portion further comprising:
- a scanning start signal generator for counting a time duration corresponding to the delay time information output from the delay time setting unit, and for outputting the scanning start signal in accordance therewith.

12. An optical scanning system, comprising:
- an optical scanning unit for scanning light onto an image print region of a photosensitive belt;
- a photodetector disposed at an edge of the photosensitive belt for receiving light emitted from the optical scanning unit, and for outputting a pulse signal in response to the received light; and
- an optical scanning controlling portion for controlling the optical scanning unit such that the optical scanning unit emits light corresponding to an image signal in synchronism with a scanning start signal, the scanning start signal being controlled in accordance with the pulse signal output from the photodetector;
- said optical scanning portion further comprising a delay time setting unit for accessing a memory in order to locate delay time information corresponding to the edge point of the photosensitive belt.

13. The optical scanning system of claim 12, said optical scanning controlling portion further comprising:
- a scanning, start signal generator for counting a time duration corresponding to the delay time information output from the delay time setting unit, and for outputting the scanning start signal in accordance therewith.

14. An optical scanning system, comprising:
- an optical scanning unit for scanning light onto an image print region of a photosensitive belt;
- a photodetector disposed at an edge of the photosensitive belt for receiving light emitted from the optical scanning unit, and for outputting a pulse signal in response to the received light; and
- an optical scanning controlling portion for controlling the optical scanning unit such that the optical scanning unit emits light corresponding to an image signal in synchronism with a scanning start signal, the scanning start signal being controlled in accordance with the pulse signal output from the photodetector;
- said optical scanning portion further comprising a scanning start signal generator for counting a time duration corresponding to delay time information output, and for outputting the scanning start signal in accordance therewith.

* * * * *